July 25, 1967     E. R. VANDER WALL     3,332,397
ODORLESS CAT TOILET
Filed Jan. 10, 1966
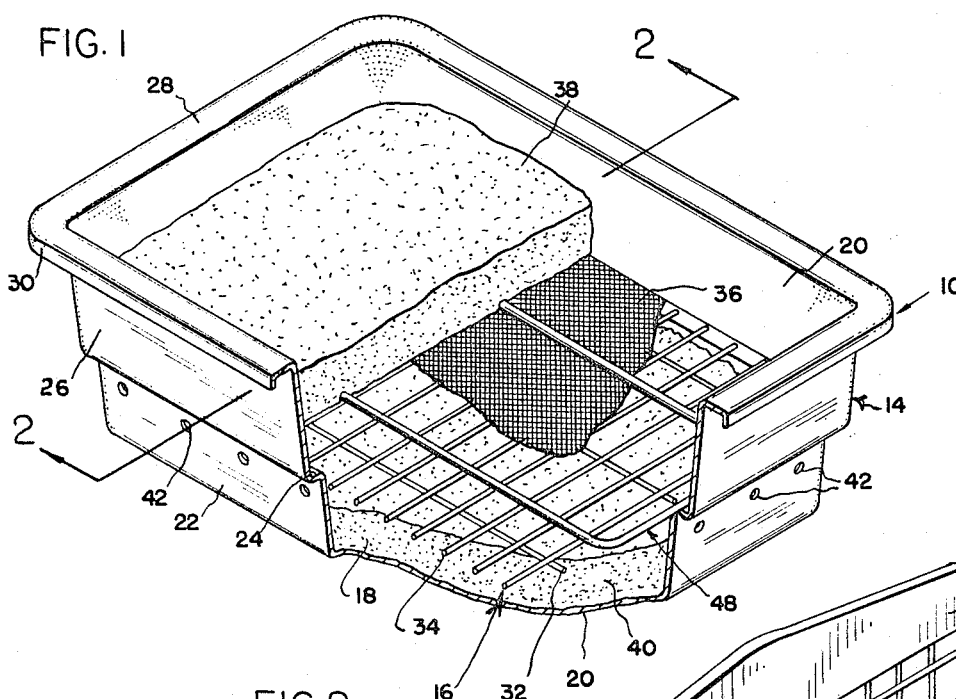
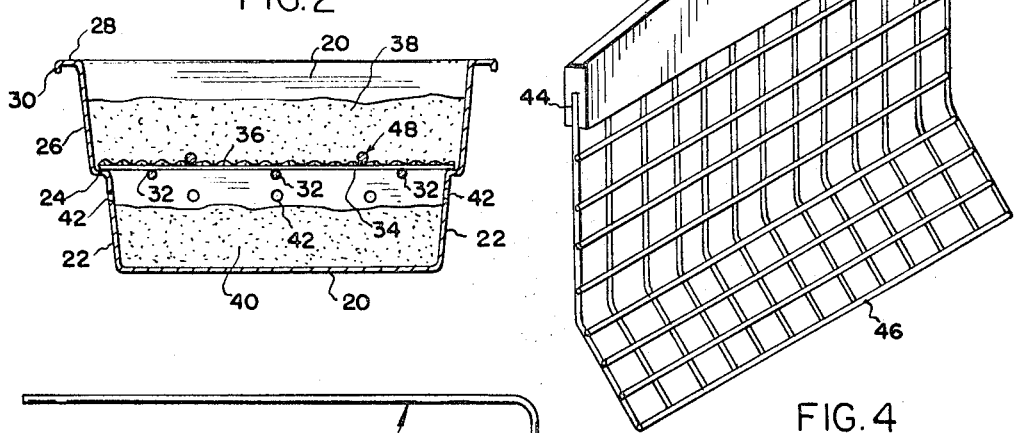
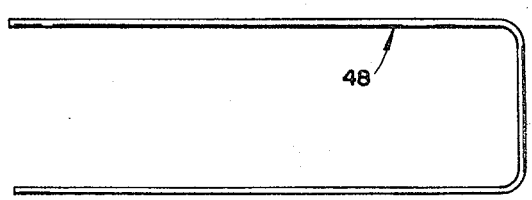
INVENTOR.
EDWIN ROBERT VANDERWALL
BY
ATTORNEY 3,332,397
ODORLESS CAT TOILET
Edwin Robert Vander Wall, 1235 Peninsula Court,
Traverse City, Mich. 49684
Filed Jan. 10, 1966, Ser. No. 519,655
13 Claims. (Cl. 119—1)

This invention relates to sanitary receptacles and more particularly to an improved odorless sanitary sand box for the use of pets with particular reference to cats.

Owners of pets that are habitually confined in a house or an apartment usually provide a box or other receptacle containing sand or a prepared deodorizing mixture commonly referred to as litter. The problem with conventional sand boxes is that the sand or litter requires continual stirring up to dry out the areas made moist by urine. In addition because the urine remains mixed with the sand, the sand or litter soon becomes spent and requires changing or cleaning. Furthermore, the solid excreta of the animal must be periodically removed from the sand, often with paper or a small hand strainer. Because the urine of the cat tends to keep the litter moist, the feces become moldy and decayed thereby overcoming the deodorizing properties of the litter. In order to overcome the above problems, some pet sand boxes have been developed, usually of a complicated assembly, that drain the liquid from the litter and solid excreta. However, none of the pet sand boxes in the prior art provide a means for deodorizing, evaporating and dehydrating the liquids and drying the litter.

The present invention overcomes the above problems by providing a cat toilet comprising an open topped receptacle having an upper and a lower compartment separated by a perforated partition. The litter is disposed in the upper compartment and a substance having deodorizing and hygroscopic characteristics such as lime is disposed in the lower compartment. The upper compartment receives the solid and liquid excreta, retains the solids and absorbs the bulk of the liquids allowing the excess liquids to drain through to the lower compartment. The separated solids in the upper compartment dry out and are easily removed by means of a sieve adapted to be easily passed through the litter containing the solids. The liquids in the lower compartment are quickly deodorized and absorbed by the lime. Apertures in the lower compartment allow air to pass through the lower compartment where the moisture is absorbed by the lime which also heats the air. The heated dry air then rises from the lower compartment up through the upper compartment thereby assisting the litter and solids to rapidly dry out. It can therefore be seen that the cat box not only remains odorless, but in addition the litter never need be removed or changed.

It is therefore an object of the present invention to provide an improved cat toilet means for rapidly drying the solid and liquid excreta and the litter.

It is another object of the present invention to provide an odorless cat toilet by providing a double compartment receptacle in which solid excreta is retained and the liquid excreta is absorbed in litter in the upper compartment and an air heating means in the lower compartment induces a continued flow of warm dry air to circulate through the contents of the upper compartment.

It is still a further object of the present invention to provide an improved cat toilet for processing animal wastes which is formed of relatively few and easily assembled components.

Another object of the present invention is to provide a cat toilet with means for easily and quickly removing the solid excreta from the litter.

Still further objects, advantages and applications of the present invention will be made apparent by the following detailed description of a preferred embodiment of the invention. The description makes reference to the accompanying drawings in which:

FIGURE 1 is a perspective veiw of a cat toilet illustrating a preferred embodiment of the invention with parts cut away for the purpose of clarity;

FIGURE 2 is a sectional view of the invention as seen from line 2—2 of FIGURE 1;

FIGURE 3 is a view of the sieve guide rod; and

FIGURE 4 is a perspective view of the dry excreta removing sieve.

Now referring to FIGURES 1 and 4, a preferred cat toilet comprises a litter box 10 and a sieve generally indicated at 12. The litter box 10 comprises an open topped receptacle 14 adapted to support a horizontal perforated partition generally indicated at 16 which forms a bottom enclosed compartment 18 and an upper open topped compartment 20.

As can best be seen in FIGURE 1 and FIGURE 2, the receptacle 14 is formed with a flat and rectangular bottom 20, four lower sides 22 extending upward from the bottom 20, a peripheral and outward extending ledge 24 projecting from the sides 22, four upper sides 26 extending upwardly from the lower ledge 24, and an upper ledge 28 extending peripherally and outwardly around the opening defined by the four upper sides 26. A lip 30 extends down from the outer edge of the upper ledge 28. The upper sides 26 and lower sides 22 have a slight outward inclination from the lower ledge 24 and the bottom 20 respectively. The receptacle 14 is preferably formed with the lower ledge 24 intermediate of the bottom 20 and the upper ledge 28.

The receptacle 14 is preferably formed of a lightweight plastic material. It could also be formed of any suitable metal treated so as to be non-corrosive.

The upper ledge 28 and the lip 30 provide a handling or gripping means for the cat owner to move the receptacle 14 to any desirable location. The ledge 28 further provides a step for the cat to enter and to leave the litter box 10.

The lower ledge 24 provides a preferred supporting structure for the perforated partition. However other conventional supporting means such as an inwardly projecting lip, brackets or the like could alternatively be used.

The perforated partition 16 preferably comprises a plurality of parallel and transversely extending rods 32 having ends adapted to removably rest on the ledge 24, a second plurality of parallel rods 34 disposed perpendicular to and fixed to the top edges of the rods 32, and a sheet of woven wire netting 36 fixed to the top edges of the rods 34. The wire netting 36 has a configuration complementary to the interior of the upper compartment 20 so that the rods 32, rods 34 and the netting 36 form a rigid partition between the bottom enclosed compartment 18 and the upper open-topped compartment 20.

A conventional type litter material 38 is disposed in the upper compartment 20 and on the partition 16 to a suitable depth to allow a cat (not shown) to bury its feces (not shown) which is their habit. The litter 38 also absorbs the bulk of the cats urine. The supporting rods 34 and 32 are of a well chosen size to support the weight of the cat and the litter 38. The wire netting 36 has a mesh adapted to retain the litter 38 and the feces but to allow the excess of the cats urine to pass through to the bottom compartment 18.

Preferably a layer of lime 40 is disposed in the bottom compartment 18 to receive the liquid excreta. As is well known, the lime 40 is an anhydrous substance which readily absorbs moisture in the process of hydration. It can therefore be seen that the lime 40 will absorb liquid excreta passing into the bottom compartment 18. It has been found that the lime 40 not only dehydrates the liquid excreta, but will deodorize it as well thereby assisting to render the litter box 10 odorless. A layer of common salt or naphthalene may alternatively be used to serve the function of the lime.

The sides 22 of the bottom compartment 18 are formed with a plurality of apertures 42 above the level of the lime 40 and allow air to pass into the bottom compartment 18 where moisture from the air is absorbed by the lime. It is well known that as lime absorbs water or moisture, a substantial amount of heat is evolved. This well known effect creates convection currents in the air so that the air not only becomes dry, but heated and therefore rises up through the litter 38 in the upper open compartment 20 thereby drying the litter 38 and any feces buried therein and that the combination of the lime 40 deodorizing the liquid excreta and the warm air drying the litter 38 and feces in the upper compartment render the litter box 10 completely odorless.

Referring to FIGURE 4, the sieve 12 comprises an elongated preferably wooden handle 42 having a longitudinal slot 44 adapted to retain a woven wire netting 46. The wire netting 46 is formed with a configuration substantially complementary to the interior of the upper compartment 20 and of a size of suitable rigidity and a mesh adapted so that by passing the wire netting 46 through the litter 38, the litter 38 will pass therethrough, but the feces will be retained. Since the litter 38 and the feces are dry, they can be readily processed by the netting 46.

In order to assist passing the netting 46 over the partition 16, a guide 48 is disposed on top of the partition 16. Referring to FIGURE 3, the guide 48 is a substantially U-shaped rod element of the same length as the partition supporting rods 32. The guide 48 is disposed parallel to the rods 38 and preferably intermediate of the side walls 26.

It can therefore be seen that we have described an improved cat toilet adapted to receive solid and liquid excreta, dry the solids for easy removal by a sieve, and deodorize, dehydrate and evaporate the liquids. By providing for a chemical such as lime, salt or naphthalene in the lower compartment, a convection current of warm air is generated which passes through the litter to assist in drying the liquid excreta absorbed therein. In addition to drying the litter, the warm air deodorizes the cat toilet. It has been found that naphthalene in the form of moth balls is particularly useful for this purpose in that it not only is relatively inexpensive, but the vapors formed by sublimation assist in drying the litter and provide an excellent parasiticide for many cat parasites that normally live in litter.

The improved cat toilet as described herein not only represents a functional improvement over the prior art, but as illustrated in the preferred embodiment as comprising a plastic unitary double compartmented receptacle is lightweight and inexpensive to manufacture.

Having described my invention, I claim:

1. An odorless cat toilet for receiving solid and liquid cat excreta with means for easily drying and removing the solids and removing, evaporating and dehydrating the liquids comprising:
   (a) a receptacle having an open top for receiving solid and liquid excreta;
   (b) a perforated partition disposed within the receptacle having a configuration substantially complementary to the interior of the receptacle and spaced from the bottom thereof so as to form an upper open topped compartment and a lower enclosed bottom compartment, and said perforated partition adapted to contain a granular material and the solid excreta in the upper compartment, but to allow the liquid excreta to pass therethrough from the upper compartment to the lower compartment;
   (c) a granular sand-like material disposed in said upper compartment;
   (d) means for dehydrating the liquid excreta disposed in said lower compartment and evaporating the liquid excreta absorbed by the sand-like material; and
   (e) sieve means for removing the solid excreta from said upper compartment adapted to be passed through said sand-like material to remove said solid excreta but leave said granular material.

2. An odorless cat toilet as recited in claim 1, wherein the means for holding said perforated partition within said receptacle comprises said receptacle being formed with an internal peripheral ledge spaced from the bottom of said receptacle and adapted so that the perforated partition may rest thereon.

3. A cat toilet as recited in claim 2, wherein said perforated partition comprises:
   (a) a plurality of spaced parallel support rods with ends adapted to rest on said peripheral ledge and said rods adapted to support the weight of said sand-like material, the solid excreta and a cat;
   (b) a plurality of spaced parallel screen supporting rods fixed in perpendicular relationship to the top edge of said support rods; and
   (c) a sheet of woven wire netting fixed to said support rods, said wire netting adapted to contain said granular material in said upper compartment, but to allow the liquid excreta to pass therethrough, and said netting having a configuration substantially complementary to the interior of said receptacle so as to form a partition between said upper compartment and said lower.

4. A cat toilet as recited in claim 1, wherein the means for dehydrating the liquid excreta disposed in said lower compartment comprises a hygroscopic means disposed in said lower compartment to absorb the liquid excreta.

5. A cat toilet as recited in claim 1, wherein the means for dehydrating the liquid excreta disposed in said lower compartment comprises an anhydrous substance disposed in said lower compartment for absorbing water from said liquid excreta.

6. A cat toilet as recited in claim 1, wherein the means for dehydrating said liquid excreta from said lower compartment comprises a quantity of lime disposed in said lower compartment to dehydrate and render inoffensive said liquid excreta.

7. A cat toilet as recited in claim 1, wherein said sieve means comprises:
   (a) a substantially flat rigid wire netting adapted to allow the granular material to pass therethrough but to contain said solid excreta, and said wire netting having a configuration substantially complementary to the interior of said upper compartment so that one pass of said netting through the granular material in said upper compartment will remove the said solid excreta, and
   (b) handle means fixed to said wire netting.

8. A cat toilet as recited in claim 7 including guide means disposed within said upper compartment to assist said sieve means in passing through the granular material in said upper compartment.

9. A cat toilet as recited in claim 1, wherein said bottom compartment is provided with an aperture to allow air to pass therethrough, and a dehydrating and heating means disposed in said bottom compartment so that the liquid excreta in the bottom compartment is dehydrated by said means and the air is dehydrated and heated to thereby create a convection current which carries the dry air up through said partition to dry the sand-like material and the solid excreta buried therein and to evaporate liquid excreta absorbed by said sand-like material.

10. A cat toilet as recited in claim 1 wherein a naphthalic compound is disposed in said lower compartment, so that the vapors of sublimation rise through said partition to dry the sand like material and the solid excreta buried therein and to evaporate the liquid excreta absorbed by said sand like material.

11. A cat toilet, comprising:
(a) an open topped receptacle, said receptacle having a generally upwardly directed, lower, closed sidewall defining a lower compartment, said receptacle having a generally upwardly directed, upper, closed sidewall defining an upper compartment, said upper closed sidewall having a greater horizontal dimension than said lower sidewall, said receptacle having connecting structure integrally connecting the lower edge of said upper sidewall to the upper edge of said lower sidewall to form a support structure, and said lower sidewall having spaced apertures therein located in an upper portion thereof constituting a means for permitting the passage of air into said lower compartment and up through said upper compartment,
(b) a partition, said partition seated on said support structure to separate said upper compartment from said lower compartment, said partition perforated to permit liquid excreta to pass therethrough from said upper compartment to said lower compartment, but preventing the passage of a granular material disposed in said upper compartment; and
(c) a granular material, said granular material disposed in said upper compartment in said partition for the deposit of solid excreta, and said granular material having a porosity permitting the flow of air from said lower compartment upwardly through said upper compartment.

12. A cat toilet as defined in claim 11, including manually supportable sieve means for removing the solid excreta accumulated in the granular material which is disposed in said upper compartment.

13. A cat toilet as defined in claim 12, wherein said upper compartment has a pair of spaced parallel wall sections running the full length of said upper compartment, and said sieve means comprise a substantially rigid sieve member, said sieve member having a length generally corresponding to the distance between said spaced parallel wall sections and a width accommodating the normal depth of said granular material disposed in said upper compartment, and said sieve member having a mesh adapted to permit the passage of said granular material, but to collect and separate the solid exterior contained in said granular material.

References Cited
UNITED STATES PATENTS

| | | | |
|---|---|---|---|
| 2,279,405 | 4/1942 | Laughlin | 119—1 |
| 2,963,003 | 12/1960 | Oberg et al. | 119—1 |
| 2,971,493 | 2/1961 | Robb | 119—1 |
| 3,006,319 | 10/1961 | McCrory | 119—1 |
| 3,100,474 | 8/1963 | Schneider | 119—1 |
| 3,141,441 | 7/1964 | Russell | 119—1 |
| 3,217,692 | 11/1965 | Hay | 119—1 |
| 3,310,031 | 3/1967 | Lowe | 119—1 |

ALDRICH F. MEDBERY, *Primary Examiner.*

SAMUEL KOREN, *Examiner.*